United States Patent
Yoshioka

(10) Patent No.: US 9,422,852 B2
(45) Date of Patent: Aug. 23, 2016

(54) ELECTRIC HEATING CATALYST

(75) Inventor: Mamoru Yoshioka, Susono (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 229 days.

(21) Appl. No.: 13/984,189

(22) PCT Filed: Feb. 8, 2011

(86) PCT No.: PCT/JP2011/052646
§ 371 (c)(1),
(2), (4) Date: Aug. 7, 2013

(87) PCT Pub. No.: WO2012/108002
PCT Pub. Date: Aug. 16, 2012

(65) Prior Publication Data
US 2013/0312393 A1    Nov. 28, 2013

(51) Int. Cl.
*B01D 50/00* (2006.01)
*F01N 9/00* (2006.01)
*F01N 3/20* (2006.01)
*B01J 35/00* (2006.01)

(52) U.S. Cl.
CPC ............. *F01N 9/00* (2013.01); *F01N 3/2026* (2013.01); *B01J 35/0033* (2013.01); *F01N 2240/16* (2013.01); *Y02T 10/26* (2013.01)

(58) Field of Classification Search
CPC .... F01N 3/2026; F01N 2240/16; Y02T 10/26
USPC ................................. 422/174, 177
See application file for complete search history.

(56) References Cited

U.S. PATENT DOCUMENTS 5,569,455 A * 10/1996 Fukui et al. ................... 422/174
2010/0308849 A1* 12/2010 Bouteiller et al. ............ 324/700

FOREIGN PATENT DOCUMENTS

| EP | 2540382 A1 | 1/2013 |
| EP | 2554263 A1 | 2/2013 |
| EP | 2656902 A1 | 10/2013 |
| EP | 2656903 A1 | 10/2013 |
| JP | 5-115796 A | 5/1993 |
| JP | 5-269387 A | 10/1993 |
| JP | 7-204518 A | 8/1995 |

* cited by examiner

Primary Examiner — Tom P Duong
(74) Attorney, Agent, or Firm — Sughrue Mion, PLLC

(57) ABSTRACT

An object of the invention is to enhance the exhaust gas purification rate and to reduce the possibility of breakage of a heater element in an electric heating catalyst (EHC) by generating heat by the heater element in a improved manner. A pair of electrodes including surface electrodes 7a extending in the axial and circumferential directions of the heater element along the outer circumferential surface of said heater element are provided in such a way as to be opposed to each other on the heater element located therebetween. The surface electrodes 7a are adapted in such a way that current flowing between the surface electrodes 7a flows mainly on the outer circumferential surface of the heater element in a part of the heater element with respect to the axial direction and flows mainly in an inner portion of the heater element in another part of the heater element with respect to the axial direction.

2 Claims, 5 Drawing Sheets

ELECTRIC HEATING CATALYST

TECHNICAL FIELD

The present invention relates to an electric heating catalyst provided in an exhaust passage of an internal combustion engine.

BACKGROUND ART

As an exhaust gas purification catalyst provided in an exhaust passage of an internal combustion engine, there has been developed heretofore an electric heating catalyst (which will be hereinafter referred to as "EHC"), in which a catalyst is heated by a heater element that generates heat by supply of electric current.

There has been known an EHC having a structure in which two electrodes are connected to the side surface (outer circumferential surface) of a heater element in such a way as to be opposed to each other (see, e.g. Patent Document 1). In this structure, current flows between the electrodes through the heater element, whereby the heater element generates heat.

PRIOR ART DOCUMENTS

Patent Documents

Patent Document 1: Japanese Patent Application Laid-Open No. 5-269387

DISCLOSURE OF THE INVENTION

Problem to be Solved by the Invention

In cases where electrodes are provided on the outer circumferential surface of a cylindrical heater element (including one having an elliptical cross section) in such a way as to be opposed to each other, the electrodes constitute surface electrodes extending along the outer circumferential surface of the heater element. When power is supplied to the electrodes, current flows in a region of the heater element located between the surface electrodes (which will be hereinafter referred to as the "inter-electrode region"). Consequently, the temperature of the inter-electrode region rises. However, the heater element also includes regions located outside the region between the surface electrodes (i.e. regions near the portions of the outer circumferential surface on which the surface electrodes are not provided). Such regions will be hereinafter referred to as the "regions outside the inter-electrode region". Since current hardly flows in the regions outside the inter-electrode region even when power is supplied to the electrodes, the temperature of the regions outside the inter-electrode region hardly rises. Therefore, when power is applied to the electrodes, the temperature distribution in the heater element along the circumferential direction (or the width direction perpendicular to the axial direction) becomes uneven.

Such an uneven temperature distribution along the circumferential direction of the heater element prevents the catalyst from sufficiently exercising its exhaust gas purification ability in low temperature regions, leading to a decrease in the exhaust gas purification rate. Moreover, if the degree of unevenness in the temperature distribution in the heater element becomes large, breakage of the heater element can be caused by increased thermal stress.

It is possible to increase the proportion of the inter-electrode region and to decrease the proportion of the regions outside the inter-electrode region in the heater element by increasing the width of the surface electrodes along the circumferential direction of the heater element. (The width along this direction will be hereinafter simply referred to as the "width of the surface electrode(s)"). However, as the width of the surface electrodes increases, the distance between the surface electrodes on the outer circumferential surface of the heater element (which distance will be hereinafter referred to as the "circumferential distance between the surface electrodes") decreases. When circumferential distance between the surface electrodes becomes smaller than a certain distance, the flow of current flowing between the surface electrodes tends to be concentrated in an outer peripheral region of the heater element. In consequence, the temperature of this peripheral region located between the surface electrodes may rise excessively.

The present invention has been made in view of the above-described problem, and its object is to enhance the exhaust gas purification rate and to reduce the possibility of breakage of a heater element in an EHC by generating heat by the heater element in a improved manner.

Means for Solving the Problem

In an EHC according to the present invention, current flowing between surface electrodes is caused to flow mainly on an outer circumferential surface of a heater element in a part of the heater element with respect to the axial direction and to flow mainly in an inner portion of the heater element in another part with respect to the axial direction.

An electric heating catalyst according to the present invention comprises:

a heater element which has a cylindrical shape and generates heat by supply of electric current, thereby heating a catalyst;

a pair of electrodes by which electric power is supplied to said heater element and which include surface electrodes extending in the axial and circumferential directions of said heater element along the outer circumferential surface of said heater element, the surface electrodes being arranged to be opposed to each other on said heater element located therebetween, wherein said surface electrodes are adapted in such a way that current flowing between said surface electrodes flows mainly on the outer circumferential surface of said heater element in a part of said heater element with respect to the axial direction and flows mainly in an inner portion of said heater element in another part of said heater element with respect to the axial direction.

In the EHC according to the present invention, when power is supplied, the temperature of the regions outside the inter-electrode region can be raised in a part of the heater element with respect to the axial direction, and the temperature of the inter-electrode region can be raised in another part of the heater element with respect to the axial direction. Therefore, when seen throughout the entirety of the heater element along the axial direction, the temperature of the heater element can be raised in the entire area of its cross section perpendicular to the axial direction. In consequence, the exhaust gas purification rate can be enhanced, and the possibility of breakage of the heater element can be reduced.

In the electric heating catalyst according to the present invention, at least one of the surface electrodes may be adapted to have a width along the circumferential direction of the heater element that varies along the axial direction of the heater element. When at least one of the surface electrodes has, in a part, a width that is so large that the circumferential distance between the surface electrodes is smaller than a certain distance, the current can be caused to flow mainly on the outer circumferential surface of the heater element in that part.

In the electric heating catalyst according to the present invention, at least one of the surface electrodes may have a distribution of electrical resistance along the circumferential direction of said heater element that varies along the axial direction of said heater element. If the distance between the surface electrodes is the same, the smaller the electrical resistance is, the larger the current flowing between the surface electrodes tend to be. Therefore, when in at least one of the surface electrodes, the electrical resistance in a part of a region near its end with respect to the circumferential direction of the heater element is small, current can be caused to flow mainly on the outer circumferential surface of the heater element in that part.

Effects of the Invention

According to the present invention, an heater element in an EHC can be caused to generate heat in an improved manner. In consequence, the exhaust gas purification rate can be enhanced, and the possibility of breakage of the heater element can be reduced.

BRIEF DESCRIPTION OF THE DRAWINGS

FIG. 7(a) is a cross sectional view in a case where the width of the surface electrode along the circumferential direction of the catalyst carrier is relatively small. FIG. 7(b) is a cross sectional view in a case where the width of the surface electrode along the circumferential direction of the catalyst carrier is relatively large.

THE BEST MODE FOR CARRYING OUT THE INVENTION

In the following, specific embodiments of the present invention will be described with reference to the drawings. The dimensions, materials, shapes, relative arrangements, and other features of the components that will be described in connection with the embodiments are not intended to limit the technical scope of the present invention only to them, unless particularly stated.

Embodiment 1

Figure 1:
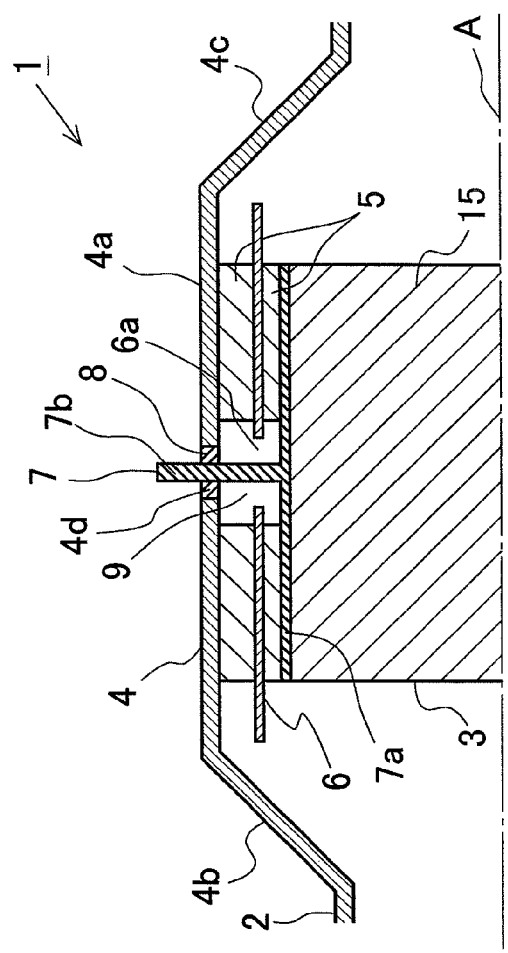
FIG. 1 is a diagram showing the basic structure of an electric heating catalyst (EHC) according to embodiment 1.

FIG. 1 is a diagram showing the basic structure of an electric heating catalyst (EHC) according to this embodiment. The EHC 1 according to this embodiment is provided in an exhaust pipe of an internal combustion engine mounted on a vehicle. The internal combustion engine may be either a diesel engine or a gasoline engine. Moreover, the EHC 1 according to this embodiment may also be used in a vehicle using a hybrid system provided with an electric motor.

FIG. 1 is a cross sectional view of the EHC 1 taken in the longitudinal direction along the center axis A of the exhaust pipe 2 of the internal combustion engine. Because the shape of the EHC 1 is symmetric with respect to the center axis A, only the upper part of the EHC 1 is shown in FIG. 1 for the sake of convenience.

The EHC 1 according to this embodiment includes a catalyst carrier 3, a casing 4, a mat 5, an inner pipe 6, and electrodes 7. The catalyst carrier 3 has a cylindrical shape with its center axis arranged coaxial with the center axis A of the exhaust pipe 2. An exhaust gas purification catalyst 15 is supported on the catalyst carrier 3. The exhaust gas purification catalyst 15 may be, for example, an oxidation catalyst, an NOx storage reduction catalyst, an NOx selective reduction catalyst, or a three-way catalyst.

The catalyst carrier 3 is made of a material that behaves as an electrical resistance, when an electric current flows through it, to generate heat. The material of the catalyst carrier 3 may be, for example, SiC. The catalyst carrier 3 has a plurality of passages (cells) that extend along the direction in which the exhaust gas flows (i.e. the direction along the center axis A) and constitute a honeycomb structure in a cross section perpendicular to the direction in which the exhaust gas flows. The exhaust gas purification catalyst 15 is supported on the partitions that define the cells, and the exhaust gas is purified as it passes through the cells. The cross section of the catalyst carrier 3 in the direction perpendicular to the center axis A may have an elliptical or other shape. The center axis A is the common center axis of the exhaust pipe 2, the catalyst carrier 3, the inner pipe 6, and the casing 4.

The catalyst carrier 3 is housed in the casing 4. The casing 4 is made of a metal. The material of the casing 4 may be, for example, a stainless steel. The casing 4 has a housing portion 4a including a curved wall extending parallel to the center axis A and tapered portions 4b, 4c bridging the housing portion 4a and the exhaust pipe 2 on the upstream and downstream sides of the housing portion 4a. The cross sectional area of the passage in the housing portion 4a is larger than the cross sectional area of the passage in the exhaust pipe 2. The catalyst carrier 3, the mat 5, and the inner pipe 6 are housed in the housing portion 4a. The tapered portions 4b, 4c are tapered in such a way that the cross sectional area of the passage decreases away from the housing portion 4a.

The mat 5 is provided between the inner wall surface of the housing portion 4a of the casing 4 and the outer circumferential surface of the catalyst carrier 3. Thus, the catalyst carrier 3 is supported by the mat 5 in the interior of the casing 4. The inner pipe 6 is held between two parts of the mat 5. In other words, the mat 5 is separated by the inner pipe 6 into a casing 4 side part and a catalyst carrier 3 side part.

The mat 5 is made of an electrical insulating material. The material of the mat 5 may be, for example, a ceramic fiber having alumina as the main ingredient. The mat 5 is wrapped around the outer circumferential surface of the catalyst carrier 3 and the outer circumferential surface of the inner pipe 6. Because the mat 5 is provided between the catalyst carrier 3 and the casing 4, electricity is prevented from flowing into the casing 4 when power is supplied to the catalyst carrier 3.

The inner pipe 6 is made of an electrical insulating material. The material of the inner pipe 6 may be, for example, alumina. The inner pipe 6 has a tubular shape about the center axis A. As shown in FIG. 1, the length of the inner pipe 6 along the center axis A is longer than the mat 5. Thus, the upstream and downstream ends of the inner pipe 6 extend beyond the upstream and downstream ends of the mat 5 respectively.

A pair of electrodes 7 is connected to the outer circumferential surface of the catalyst carrier 3. Only one of the electrodes (i.e. the upper electrode) 7 is shown in FIG. 1. Each electrode 7 is made up of a surface electrode 7a and a stem electrode 7b. The surface electrodes 7a extend in the circumferential and axial directions along the outer circumferential surface of the catalyst carrier 3. The surface electrodes 7a are arranged on the outer circumferential surface of the catalyst carrier 3 in such a way as to be opposed to each other on the catalyst carrier 3 located therebetween. Details of the surface electrodes 7a will be described later. One end of the stem electrode 7b is connected to the surface electrode 7a. The stem electrode 7b passes through an electrode chamber 9 so that the other end of the stem electrode 7b sticks out of the casing 4.

The casing 4 and the inner pipe 6 have through holes 4d, 6a through which the stem electrode 7b passes. The mat 5 has a space through which the stem electrode 7b passes. The electrode chamber 9 is constituted by a space formed between the inner wall of the casing 4 and the outer circumferential surface of the catalyst carrier 3 and defined by the mat 5 serving as its side wall. The through hole 4d (at the top of the electrode chamber 9) that the casing 4 has is provided with a support member 8 that supports the stem electrode 7b. The support member 8 is made of an electrical insulating material and fills the space between the casing 4 and the stem electrode 7b without a gap.

The other end of the stem electrode 7b is electrically connected with a battery (not shown). Power is supplied to the electrodes 7 by the battery. As power is supplied to the electrodes 7, current flows through the catalyst carrier 3. As the catalyst carrier 3 generates heat with the current flow, the exhaust gas purification catalyst 15 supported on the catalyst carrier 3 is heated and promoted in its activity.

In this embodiment, the catalyst carrier 3 corresponds to the heater element according to the present invention. However, the heater element according to the present invention is not limited to a carrier on which catalyst is supported, but it may be a structure provided upstream of the catalyst.

Figure 7:
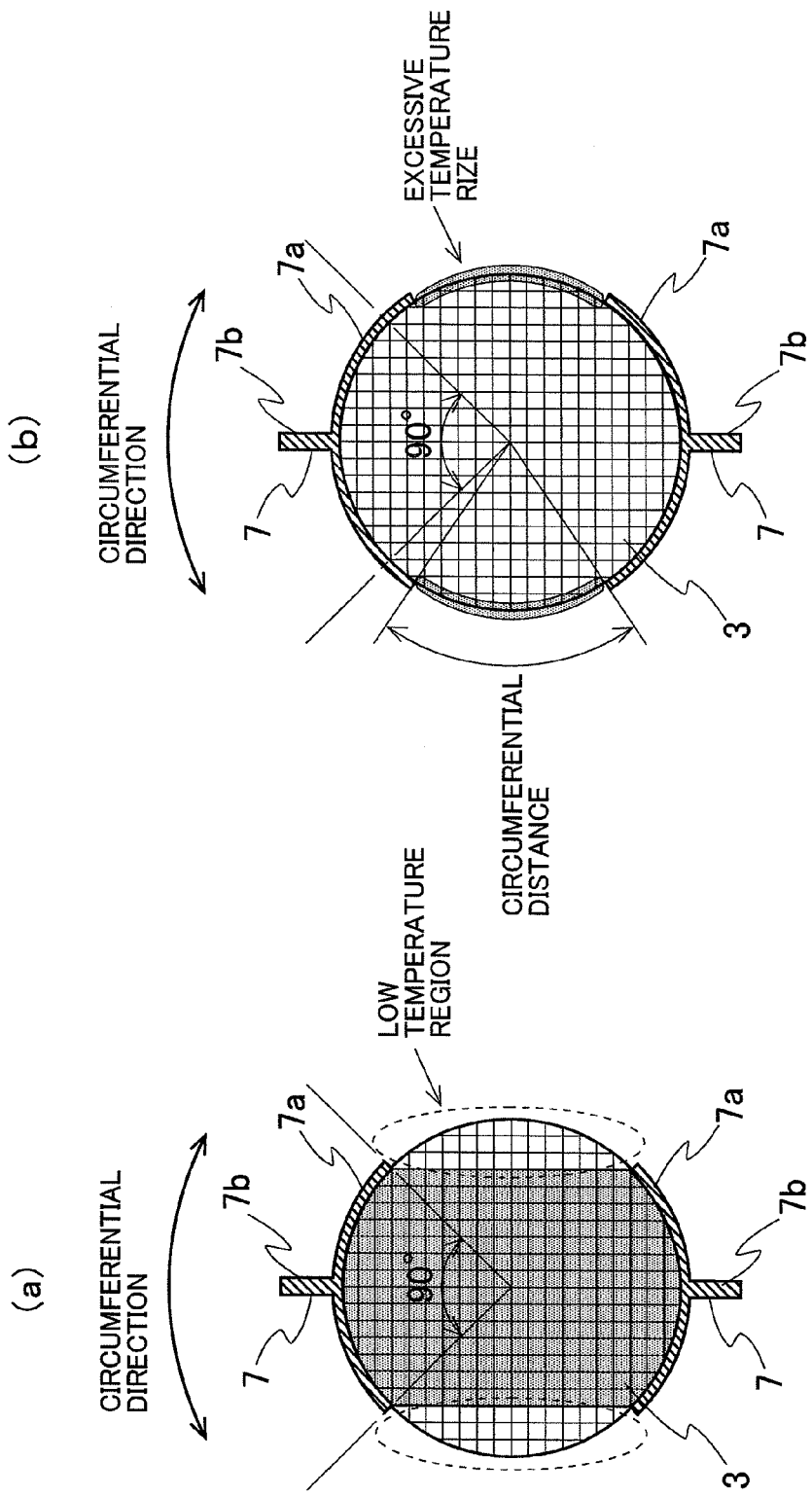
FIGS. 7(a) and 7(b) are cross sectional views of a catalyst carrier and electrodes in conventional EHCs taken in a direction perpendicular to the axial direction of the catalyst carrier.

Now, a heating state of a catalyst carrier in conventional EHCs with power supply will be described with reference to FIGS. 7(a) and 7(b). FIGS. 7(a) and (7b) are cross sectional views of a catalyst carrier 3 and electrodes 7 in conventional EHCs taken in a direction perpendicular to the axial direction of the catalyst carrier 3. FIG. 7(a) is a cross sectional view in a case where the width of the surface electrode 7a along the circumferential direction of the catalyst carrier 3 is relatively small (e.g. a case where the width of the surface electrode 7a has a central angle of 90 degrees). FIG. 7(b) is a cross sectional view in a case where the width of the surface electrode 7a along the circumferential direction of the catalyst carrier 3 is relatively large (e.g. a case where the width of the surface electrode 7a has a central angle larger than 90 degrees).

In the case where the width of the surface electrode 7a is relatively small as shown in FIG. 7(a), as power is supplied to the electrodes 7, current flows in the inter-electrode region (the gray-shaded area in FIG. 7(a)), which is the region of the catalyst carrier 3 located between the surface electrodes 7a. In consequence, the temperature of the inter-electrode region rises. However, current hardly flows in the regions outside the inter-electrode region (regions encircled by broken lines in FIG. 7(a)), which are the regions of the catalyst carrier 3 located outside the region between the surface electrodes 7a. Therefore, the temperature of the regions outside the inter-electrode region hardly rises, and these regions will become low temperature regions.

If there are such low temperature regions in the catalyst carrier 3, the exhaust gas purifying ability of the catalyst cannot be exercised sufficiently in the low temperature regions, leading to a decrease in the exhaust gas purification rate. Moreover, if the degree of unevenness in the temperature distribution in the catalyst carrier 3 becomes large, breakage of the catalyst carrier 3 can be caused by increased thermal stress.

On the other hand, if the width of the surface electrodes 7a are increased as shown in FIG. 7(b) with a view to eliminate or reduce low temperature regions in the catalyst carrier 3, the circumferential distance between the surface electrodes 7a will become small. If the circumferential distance between the surface electrodes 7a becomes smaller than a certain distance, the flow of current tends to be more concentrated in outer peripheral regions of the catalyst carrier 3 (the gray-shaded areas in FIG. 7(b)). As a consequence, the temperature of the outer peripheral regions located between the surface electrodes may rise excessively.

Figure 2:
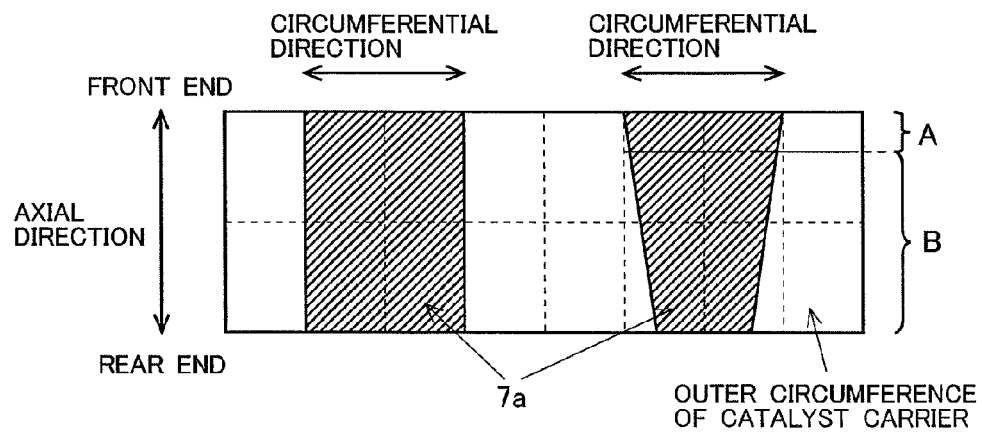
FIG. 2 shows the outer circumferential surface of a catalyst carrier in the EHC according to embodiment 1 in a developed view.

In the EHC according to this embodiment, the width of one of the surface electrodes 7a is varied gradually along the axial direction of the catalyst carrier 3. FIG. 2 shows the outer circumferential surface of the catalyst carrier in the EHC according to this embodiment in a developed view. In FIG. 2, the hatched areas represent the surface electrodes 7a.

As shown in FIG. 2, the width of one surface electrode 7a gradually decreases from the front end (at the entrance of the exhaust gas) of the catalyst carrier 3 toward the rear end (at the exit of the exhaust gas). The width of the other surface electrode 7a is constant. In a region near the front end (i.e. region A in FIG. 2) in which the width of one surface electrode 7a is large, the circumferential distance between the surface electrodes 7a is so small that the current flowing between the surface electrodes 7a flows mainly on the surface of the catalyst carrier 3. On the other hand, in a region downstream of the above-mentioned region near the front end (i.e. region B in FIG. 2), the circumferential distance between the surface electrodes 7a is so large that the current flowing between the surface electrodes 7a flows mainly in the inner portion of the catalyst carrier 3.

With the above-described shape of the surface electrodes 7a, when power is supplied, the temperature of the regions outside the inter-electrode region can be raised in the part of the catalyst carrier near the front end, and the temperature of the inter-electrode region can be raised in the part of the catalyst carrier 3 downstream of its part near the front end. Therefore, when seen throughout the entirety of the catalyst carrier 3 along the axial direction, the temperature of the catalyst carrier 3 can be raised in the entire area of its cross section perpendicular to the axial direction.

This means that in both the cells located in the inter-electrode region and the cells located in the regions outside the inter-electrode region in the catalyst carrier 3, the temperature of at least a part of each cell with respect to the axial direction rises. In consequence, the quantity of flow of the exhaust gas that passes through the EHC 1 without coming in contact with the activated exhaust gas purification catalyst 15 is reduced. Therefore, the exhaust gas purification rate can be enhanced. Moreover, since the degree of unevenness in the temperature distribution in the catalyst carrier 3 during the power supply is reduced, the possibility of breakage of the catalyst carrier 3 can be reduced.

While in the above-described case the width of the surface electrode 7a of only one of the two electrodes 7 is gradually varied along the axial direction of the catalyst carrier 3, the widths of the surface electrodes 7a of both the electrodes may be varied gradually. In the latter case, the surface electrodes 7a may be designed in such a way that the width of one surface electrode 7a decreases gradually from the front end toward the rear end of the catalyst carrier 3 and the width of the other surface electrode 7a increases gradually from the front end toward the rear end of the catalyst carrier 3.

Alternatively, the width of the surface electrode 7a may be varied stepwise along the axial direction of the catalyst carrier 3. For example, in FIG. 2, the width of the surface electrode 7a may be larger in the region A than in the region B, and constant in each of the region A and the region B.

(Modification)

Figure 3:
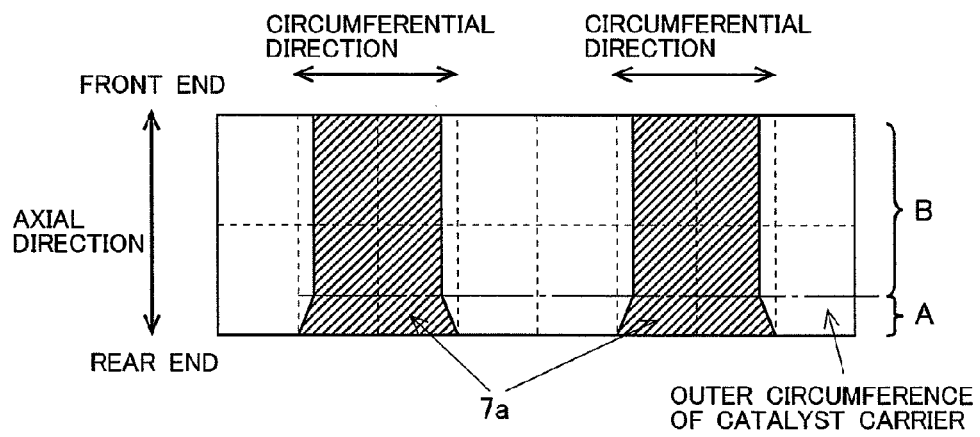
FIG. 3 shows the outer circumferential surface of a catalyst carrier in an EHC according to a modification of embodiment 1 in a developed view.

FIG. 3 shows the outer circumferential surface of the catalyst carrier in an EHC according to a modification of the embodiment in a developed view. In FIG. 3, the hatched areas represent the surface electrodes 7a, as with in FIG. 2.

In this modification, in both the surface electrodes 7a, the width of a part near the rear end of the catalyst carrier 3 (the part in region A in FIG. 3) is larger than the width of a part upstream of the above mentioned part near the rear end (the part in region B in FIG. 3). Thus, in the region near the rear end, the circumferential distance between the surface electrodes 7a is so small that the current flowing between the surface electrodes 7a flows mainly on the surface of the catalyst carrier 3. On the other hand, in the region upstream of the above-mentioned region near the front end, the circumferential distance between the surface electrodes 7a is so large that the current flowing between the surface electrodes 7a mainly flows in the inner portion of the catalyst carrier 3.

When, as shown in FIG. 2, the width of the part of the surface electrode 7a near the front end of the catalyst carrier 3 is so large that the current flowing between the surface electrodes 7a flows mainly on the surface of the catalyst carrier 3, the regions outside the inter-electrode region can be raised during the power supply, in the region near the front end. However, the region of the catalyst carrier 3 near the front end is apt to be cooled by the exhaust gas flowing into the EHC 1. Therefore, even if the temperature of the regions outside the inter-electrode region is raised in the region of the catalyst carrier 3 near the front end, the temperature of the regions outside the inter-electrode region in the region near the front end is apt to fall in a relatively short time after the turn-off of the power supply.

On the other hand, in the part of the surface electrode 7a near the rear end of the catalyst carrier 3, the exhaust gas raised in temperature by heat transfer while flowing in the EHC 1 passes. Therefore, the part near the rear end is unlikely to be cooled by the exhaust gas. For this reason, the temperature of the regions outside the inter-electrode region is less apt to fall after the turn-off of the power supply in the case where the temperature of the regions outside the inter-electrode region is raised in the region near the rear end of the catalyst carrier 3 as is the case with this modification than in the case where the temperature of the regions outside the inter-electrode region is raised in the region near the front end of the catalyst carrier 3. In consequence, it is possible to maintain a high exhaust gas purification rate for a longer period of time.

Embodiment 2

The basic structure of an electric heating catalyst (EHC) according to this embodiment is the same as the EHC according to embodiment 1 except for the construction of the surface electrodes. In the following, the construction of the surface electrodes in the EHC according to this embodiment will be described.

Figure 4:
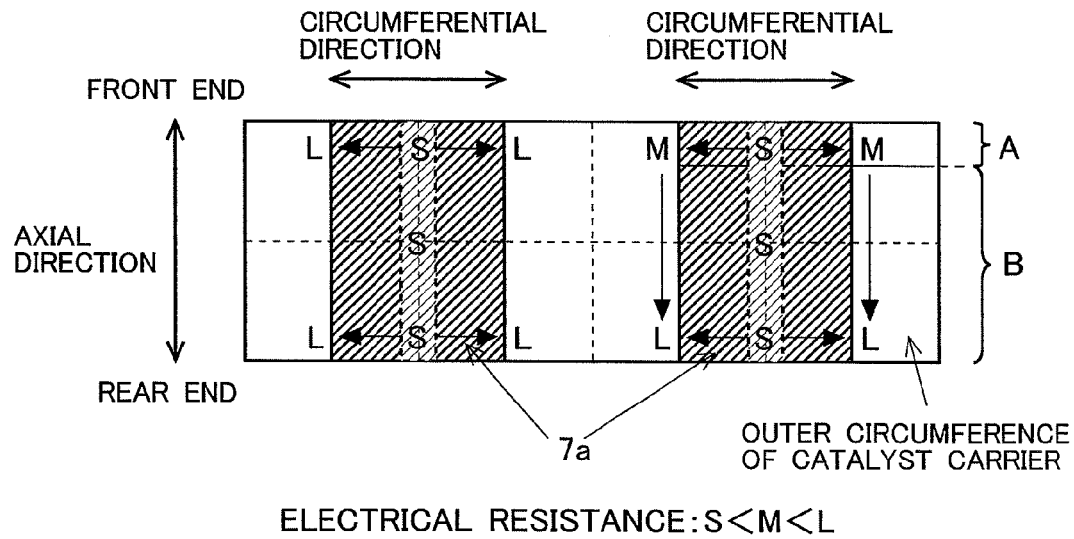
FIG. 4 shows the outer circumferential surface of a catalyst carrier in an EHC according to embodiment 2 in a developed view.

FIG. 4 shows the outer circumferential surface of the catalyst carrier in the EHC according to this embodiment in a developed view. In FIG. 4, the hatched areas represent the surface electrodes 7a. In this embodiment, as shown in FIG. 4, the width of the surface electrode 7a is constant in both of the two electrodes 7. However, the distribution of the electrical resistance in the surface electrodes 7a is uneven. In FIG. 4, characters S, M, and L represent the magnitude of electrical resistance in the surface electrodes 7a. In the surface electrodes 7a, the electrical resistance of the portions designated by S is smaller than that of the portions designated by M, and the electrical resistance of the portions designated by L is larger than that of the portions designated by M. In other words, in the surface electrodes 7a, the electrical resistance gradually increases from portions S to portions M, from portions S to portions L, and from portions M to portions L.

The electrical resistance of the surface electrode 7a can be varied by varying the thickness of the surface electrode 7a from position to position. Specifically, a relatively thin portion of the surface electrode 7a has an electrical resistance larger than a relatively thick portion. The electrical resistance of the surface electrode 7a can also be varied by varying the material of the surface electrode 7a from position to position.

Since the surface electrode 7a extends along the outer circumferential surface of the catalyst carrier 3, its cross section in the direction perpendicular to the axial direction of the catalyst carrier 3 has an arc shape. Therefore, the direct distance between the surface electrodes 7a sandwiching the catalyst carrier 3 is largest at the center and smallest at both ends with respect to the circumferential direction of the catalyst carrier 3 (or the width direction of the surface electrodes 7a). If the distribution of the electrical resistance of the surface electrodes 7a is even, the smaller the distance between the surface electrodes 7a is, the larger the current flow tend to be.

In view of this, in this embodiment, in order to reduce the variation in quantity of current flowing between the surface electrodes 7a with respect to the width direction of the surface electrodes 7a, the electrical resistance of the surface electrodes 7a is smallest in their central portions with respect to the width direction and gradually increases toward their ends with respect to the width direction, as shown in FIG. 4. (In the following, the end portions of the surface electrode 7a with respect to this direction will be referred to as "the circumferential end portion of the surface electrode 7a".)

In this embodiment, in one of the surface electrodes 7a, the electrical resistance in the portions near its circumferential ends is gradually varied along the axial direction of the catalyst carrier 3. Specifically, as shown in FIG. 4, in one of the surface electrodes 7a. the electrical resistance in the portions near the circumferential ends increases gradually from the front end (at the entrance of the exhaust gas) toward the rear end (at the exit of the exhaust gas) of the catalyst carrier 3. Moreover, in the region near the front end (i.e. in the region A in FIG. 4), where the electrical resistance in the circumferential end portions of this one surface electrode 7a is smallest, the electrical resistance in these portions is so small that the current flowing between the surface electrodes 7a flows mainly on the surface of the catalyst carrier 3. On the other hand, in the region downstream of the above-mentioned region near the front end (i.e. in the region B in FIG. 4), the electrical resistance in the circumferential end portions is relatively large so that the current flowing between the surface electrodes 7a flows mainly in the inner portion of the catalyst carrier 3.

With the above-described characteristics of the surface electrodes 7a, when power is supplied, the temperature of the regions outside the inter-electrode region can be raised in the region of the catalyst carrier 3 near the front end, and the temperature of the inter-electrode region can be raised in the region of the catalyst carrier 3 downstream of its region near the front end, as with in the EHC according to embodiment 1. Therefore, when seen throughout the entirety of the catalyst carrier 3 along the axial direction, the temperature of the catalyst carrier 3 can be raised in the entire area of its cross section perpendicular to the axial direction. Therefore, the exhaust gas purification rate can be enhanced, and the possibility of breakage of the catalyst carrier 3 can be reduced, for the reason same as that in the case of embodiment 1.

While in the above-described case, the electrical resistance in the circumferential end portions of the surface electrode 7a of only one of the two electrodes 7 is varied gradually along the axial direction of the catalyst carrier 3, the electrical resistance in the circumferential end portions of the surface electrodes 7a of both the electrodes may be varied gradually along the axial direction of the catalyst carrier 3. In the latter case, the surface electrodes 7a may be designed in such a way that the electrical resistance in the circumferential end portions of one surface electrode 7a increases gradually from the front end toward the rear end of the catalyst carrier 3 and the electrical resistance in the circumferential end portions of the other surface electrode 7a increases gradually from the front end toward the rear end of the catalyst carrier 3.

Alternatively, the electrical resistance in the circumferential end portions of the surface electrode 7a may be varied stepwise. For example, in FIG. 4, the electrical resistance in the circumferential end portions of the surface electrode 7a may be larger in the region A than in the region B, and constant in each of the region A and the region B.

(Modification)

Figure 5:
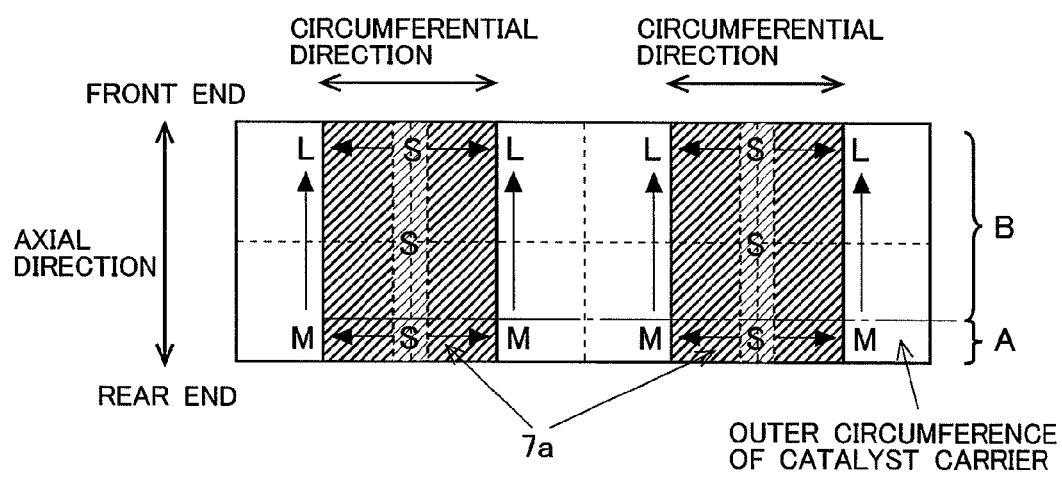
FIG. 5 shows the outer circumferential surface of a catalyst carrier in an EHC according to a modification of embodiment 2 in a developed view.

FIG. 5 shows the outer circumferential surface of the catalyst carrier in the EHC according to a modification of this embodiment in a developed view. In FIG. 5, the hatched areas represent the surface electrodes 7a, as with in FIG. 4. In FIG. 5, characters S, M, and L represent the magnitude of electrical resistance in the surface electrodes 7a, as with in FIG. 4. In the surface electrodes 7a, the electrical resistance of the portions designated by S is smaller than that of the portions designated by M, and the electrical resistance of the portions designated by L is larger than that of the portions designated by M.

In this modification, as shown in FIG. 5, the electrical resistance of the circumferential end portions is smaller in the region near the rear end of the catalyst carrier 3 (i.e. in the region A in FIG. 5) than in the region upstream of the region near the rear end (i.e. in the region B in FIG. 5), in both the surface electrodes 7a. Thus, in the region near the rear end, the electrical resistance in the circumferential end portions of the surface electrodes 7a is so small that the current flowing between the surface electrodes 7a flows mainly on the surface of the catalyst carrier 3. On the other hand, in the region upstream of the above-mentioned region near the rear end, the electrical resistance in the circumferential end portions of the surface electrodes 7a is so large that the current flowing between the surface electrodes 7a flows mainly in the inner portion of the catalyst carrier 3.

In consequence, the temperature of the regions outside the inter-electrode region can be raised in the region near the rear end of the catalyst carrier 3, as with in the EHC according to the modification of embodiment 1. Therefore, the temperature of the regions outside the inter-electrode region is less apt to fall after the turn-off of the power supply than in the case where the temperature of the regions outside the inter-electrode region is raised in the region near the front end of the catalyst carrier 3. In consequence, it is possible to maintain a high exhaust gas purification rate for a longer period of time.

Referential Example

Figure 6:
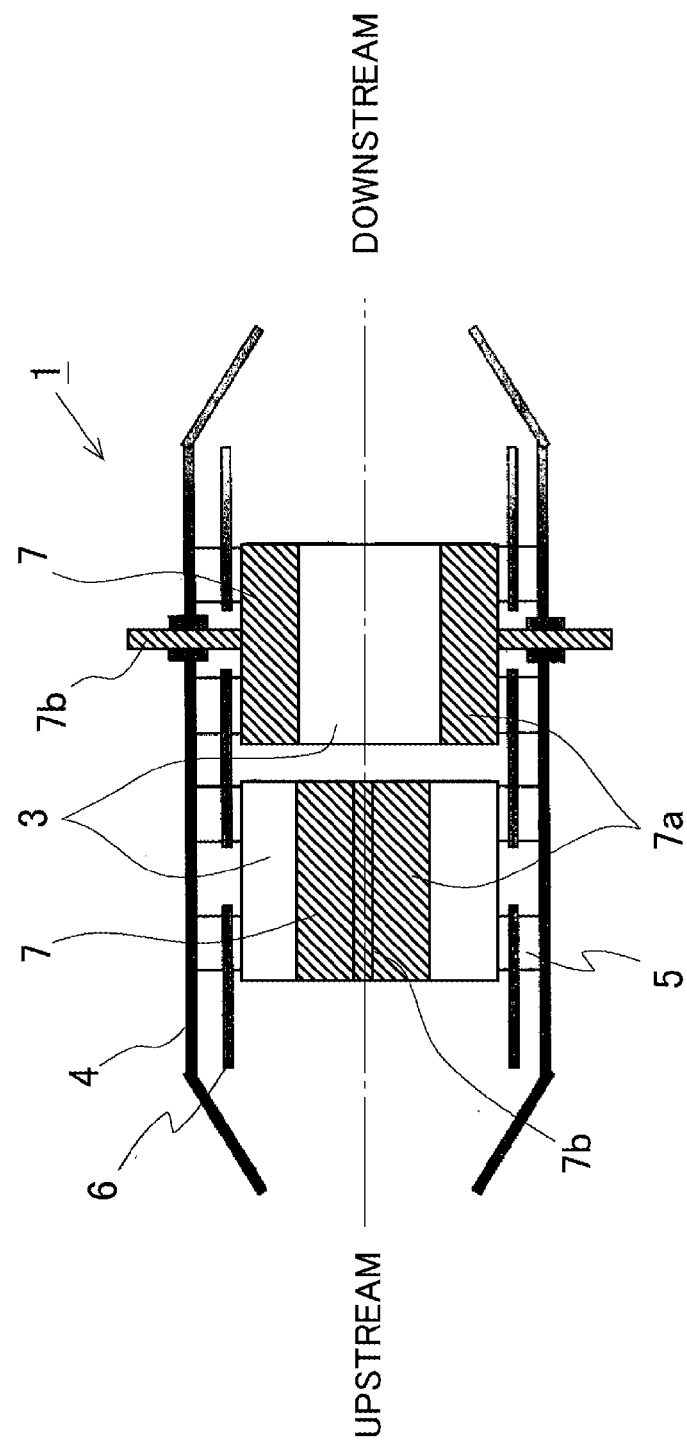
FIG. 6 is a diagram showing the basic structure of an EHC according to a referential example.

FIG. 6 is a diagram showing the basic structure of an EHC according to a referential example. In this referential example, as shown in FIG. 6, the catalyst carrier 3 is divided into two parts along the axial direction in the casing 4 of the EHC 1. Pairs of electrodes 7 are provided respectively for the upstream and downstream catalyst carriers 3. The surface electrodes 7a provided on the outer circumferential surfaces of the respective catalyst carriers 3 are arranged in such a way that their positions along the circumference of the catalyst carriers 3 do not overlap with each other. For example, if the width of the surface electrodes has a central angle of 90 degrees, the surface electrodes 7a provided on the upstream catalyst carrier 3 and the surface electrodes 7a provided on the downstream catalyst carrier 3 may be arranged at an angular positional difference of 90 degrees along the circumferential direction from each other.

When power is supplied, current flows between the surface electrodes 7a through the inter-electrode region in each of the catalyst carriers 3. Consequently, in each of the catalyst carriers 3, the regions outside the inter-electrode region will become low-temperature regions. However, the regions constituting the regions outside the inter-electrode region in the upstream catalyst carrier 3 constitute the inter-electrode region in the downstream catalyst carrier 3. Similarly, the regions constituting the regions outside the inter-electrode region in the downstream catalyst carrier 3 constitute the inter-electrode region in the upstream catalyst carrier 3.

Therefore, when seen in the entirety including the upstream and downstream catalyst carriers 3 along the axial direction, the temperature of the catalyst carrier 3 can be raised in the entire area of its cross section perpendicular to the axial direction. Therefore, the exhaust gas purification rate can be enhanced.

The catalyst carrier 3 may be divided into three or more parts along the axial direction.

DESCRIPTION OF THE REFERENCE NUMERALS AND SYMBOLS

1: electric heating catalyst (EHC)
3: catalyst carrier
4: casing
7: electrode
7a: surface electrode
7b: stem electrode

The invention claimed is:

1. An electric heating catalyst comprising:
a heater element which has a cylindrical shape and generates heat by supply of the electrical current, thereby heading a catalyst;
a pair of electrodes by which electric power is supplied to said heater element and which include surface electrodes extending in axial and circumferential directions of said heater element along an outer circumferential surface of said heater element, said surface electrodes being arranged to be opposed to each other on said heater element located therebetween, wherein the width along the circumferential direction of said heater element of at least one of said surface electrodes varies along the axial direction of said heater element such that current flowing between said surface electrodes flows mainly on the outer circumferential surface of said heater element in a art of said heater element with respect to the axial direction and flows mainly in an inner portion of said heater element in another part of said heater element with respect to the axial direction.

2. An electric heating catalyst comprising:

a heater element which has a cylindrical shape and generates heat by supply of electric current, thereby heating a catalyst;

a pair of electrodes by which electric power is supplied to said heater element and which include surface electrodes extending in axial and circumferential directions of said heater element along an outer circumferential surface of said heater element, said surface electrodes being arranged to be opposed to each other on said heater element located therebetween, wherein distribution of electrical resistance along the circumferential direction of said heater element in at least one of said surface electrodes varies along the axial direction of said heater element such that current flowing between said surface electrodes flows mainly on the outer circumferential surface of said heater element in a part of said heater element with respect to the axial direction and flows mainly in an inner portion of said heater element in another part of said heater element with respect to the axial direction.

* * * * *